(12) United States Patent
Bahadur

(10) Patent No.: US 12,071,241 B2
(45) Date of Patent: Aug. 27, 2024

(54) HAPTIC SIGNAL AND CONTROLS FOR AIRCRAFT PASSENGER SEATS

(71) Applicant: B/E Aerospace, Inc., Winston-Salem, NC (US)

(72) Inventor: Lal Bahadur, Gulf Shores, AL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 78 days.

(21) Appl. No.: 17/901,505

(22) Filed: Sep. 1, 2022

(65) Prior Publication Data

US 2023/0365260 A1     Nov. 16, 2023

(30) Foreign Application Priority Data

May 14, 2022 (IN) .............................. 202211027834

(51) Int. Cl.
    *B64D 11/00*         (2006.01)

(52) U.S. Cl.
    CPC .. *B64D 11/00153* (2014.12); *B64D 11/00155* (2014.12)

(58) Field of Classification Search
    CPC ..................... B64D 11/00153; B64D 11/00155
    See application file for complete search history.

(56) References Cited

U.S. PATENT DOCUMENTS

| | | | |
|---|---|---|---|
| 7,932,837 B2 | 4/2011 | Giesa et al. | |
| 9,007,219 B2 | 4/2015 | Perle | |
| 9,849,988 B2 | 12/2017 | Carles et al. | |
| 9,978,226 B1 | 5/2018 | Mankame et al. | |
| 10,757,451 B2 | 8/2020 | Pujia et al. | |
| 11,190,917 B2 | 11/2021 | Herrera et al. | |
| 2011/0018740 A1 | 1/2011 | Boren et al. | |
| 2013/0154319 A1* | 6/2013 | Nouvel ............. | B64D 11/0689 |
| | | | 297/217.3 |
| 2022/0048629 A1 | 2/2022 | Noshari | |

FOREIGN PATENT DOCUMENTS

CN            204473146 U      7/2015

OTHER PUBLICATIONS

Extended European Search Report dated Oct. 2, 2023; European Application No. 23172426.1.

* cited by examiner

*Primary Examiner* — Hongmin Fan
(74) *Attorney, Agent, or Firm* — Suiter Swantz IP

(57) ABSTRACT

A system for alerting a passenger is disclosed. The system includes an aircraft seat including a haptic mechanism, the haptic mechanism configured to be selectively activated. The system includes one or more buttons operationally coupled to the haptic mechanism. The one or more buttons are configured to be selectively operated. The one or more buttons are further configured to activate the haptic mechanism based on an operation of at least one of the one or more buttons.

20 Claims, 2 Drawing Sheets

HAPTIC SIGNAL AND CONTROLS FOR AIRCRAFT PASSENGER SEATS

TECHNICAL FIELD

The present application claims the benefit of India Provisional Patent Application 202211027834, filed May 14, 2022, titled HAPTIC SIGNAL AND CONTROLS FOR AIRCRAFT PASSENGER SEATS, naming Lal Bahadur as inventor, which is incorporated herein by reference in the entirety.

TECHNICAL FIELD

The present disclosure relates generally to passenger alert systems and more particularly to haptic-based and visual-based passenger alert systems.

BACKGROUND

Typically, passengers are alerted through an intercom or through personal interactions. For example, person-to-person touching, light shaking, speaking, and the like are used. These techniques may be limited in their ability to alert passengers. For example, hearing impaired passengers may not hear an intercom or a person attempting to speak to them. Further, passengers may wish to egress past other passengers in the same row, but may not have a polite and efficient method to do so.

SUMMARY

A system for alerting a passenger is disclosed. The system includes an aircraft seat including a haptic mechanism, the haptic mechanism configured to be selectively activated. The system includes one or more buttons operationally coupled to the haptic mechanism. The one or more buttons are configured to be selectively operated. The one or more buttons are further configured to activate the haptic mechanism based on an operation of at least one of the one or more buttons.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
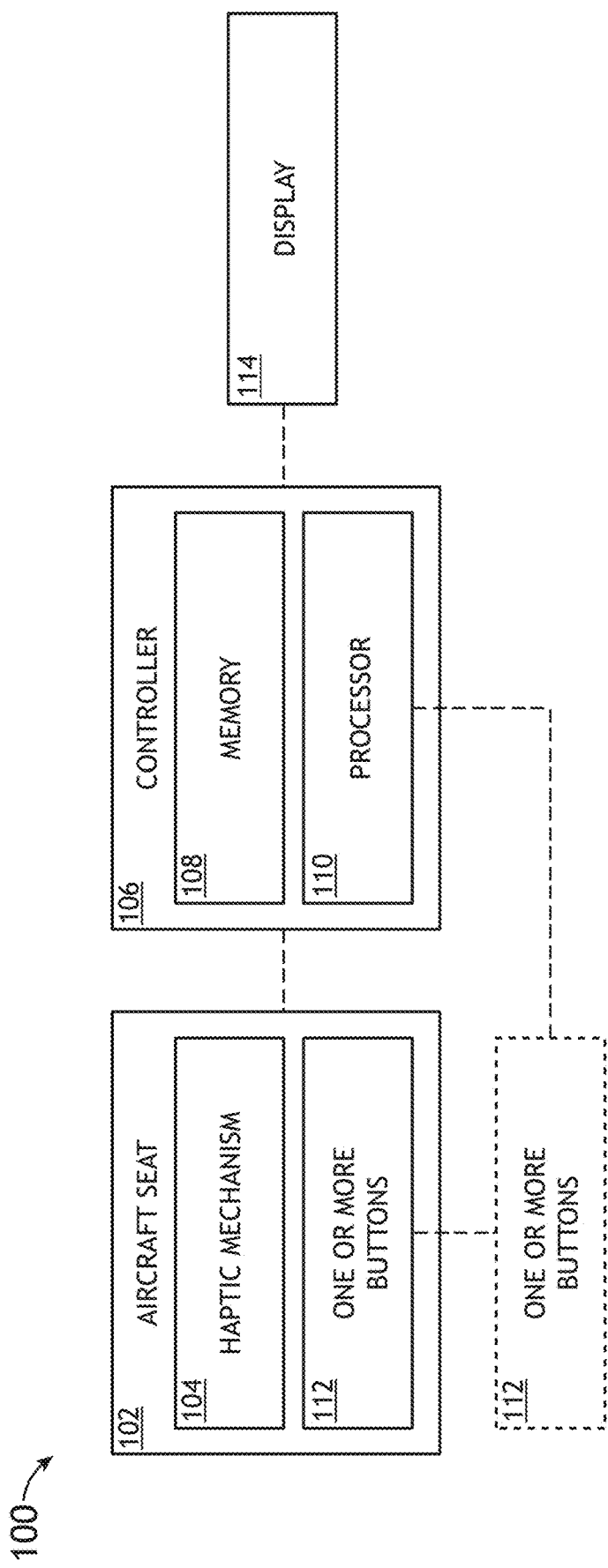
FIG. 1 illustrates a block diagram of a system for alerting a passenger, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the inventive concepts disclosed herein are directed to alerting passengers through haptic sensations (e.g., vibrations) and visual alerts.

There are many challenges to alerting passengers who are hearing impaired, using headphones, or are not paying attention. Audio alerts (e.g., intercoms and speaking) would not be appropriate for obvious reasons. Further, passengers who wish to egress past other passengers may not speak the same language, or may wish to do so without physically disturbing the other passengers or raising their voice. Visual alerts may also be ineffective if the desired recipient is not looking at the screen (e.g., they are sleeping or looking elsewhere) or are visually impaired. It is contemplated herein that conventional passenger alerting systems and methods fail to provide a solution for crew and/or other passengers to effectively and conveniently alert a variety of passengers in a wide range of situations, as allowed by at least some embodiments of the present disclosure.

In embodiments of the present disclosure, a passenger may be alerted via a haptic mechanism that vibrates and is activated by one or more conveniently located buttons. Further, in at least some examples, a one or more of a variety of graphical (visual) alerts may be configured to accompany the haptic mechanism activation. In this regard, various use cases (e.g., methods) are provided for. It should be noted that the following use cases are for illustrative purposes and are non-limiting, and other use-cases may be achieved.

In at least one use-case, a passenger (e.g., hearing impaired or sleeping passenger) is alerting by a vibrating haptic mechanism in their seat, causing an alert. Further, such an alert may in turn cause the passenger to view a graphical alert message on a display. This may be an effective and convenient way of alerting a variety of passengers for a variety of types of alerts.

In at least another use-case, a pilot may use a system (e.g., system 100) to alert one or more sections of passengers quickly and safely in an emergency (e.g., sleeping and/or visually/hearing impaired passengers). Such an alert during an emergency may be critically beneficial because quick reaction times and communication to passengers in an emergency are often critical to achieving optimal outcomes. For example, a button of the system may be located proximate to a pilot seat and configured to activate one or more haptic mechanisms of one or more aircraft seats.

Referring to FIG. 1, a block diagram of a system 100 for alerting a passenger is disclosed, in accordance with one or more embodiments of the present disclosure. The system 100 may include a haptic mechanism 104. The system 100 may include one or more buttons 112. The system 100 may include a controller 106 having a memory 108 and one or more processors 110 (e.g., controller 106 may include or be program products comprising machine-readable storage media). The controller 106 may be coupled to a display 114. In at least one embodiment, the system includes an aircraft seat 102 having the haptic mechanism 104.

In embodiments, the one or more buttons 112 are operationally coupled to the haptic mechanism 104. For example, an activation of a button 112 may be configured to cause an operation of the haptic mechanism 104.

In embodiments, the haptic mechanism 104 is configured to be selectively activated.

In embodiments, the one or more buttons 112 are configured to be selectively operated.

In embodiments, the one or more buttons 112 are further configured to activate the haptic mechanism 104 based on an operation of at least one of the one or more buttons 112.

In embodiments, the controller 106 is communicatively coupled to the display 114.

In embodiments, the controller 106 is communicatively coupled to the one or more buttons 112.

Figure 2:
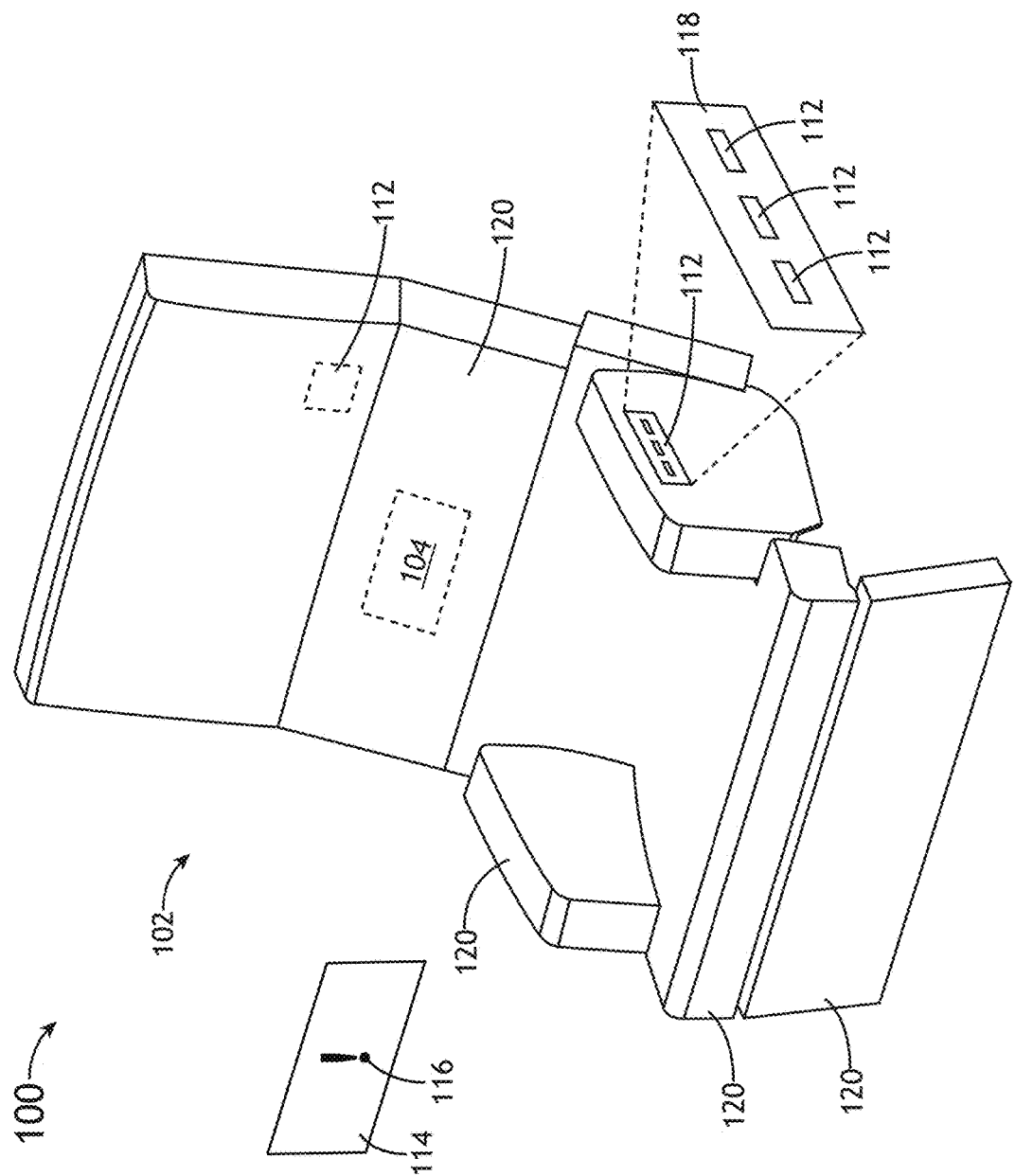
FIG. 2 illustrates a schematic of a system for alerting a passenger, in accordance with one or more embodiments of the present disclosure.

Referring to FIG. 2, schematic of a system 100 for alerting a passenger is disclosed, in accordance with one or more embodiments of the present disclosure.

In embodiments, the display 114 is positioned to be viewable from the aircraft seat 102 and is corresponding to the aircraft seat 102. For example, the display 114 may be structurally coupled to the back of a different seat (not shown) in front of the aircraft seat 102.

In some embodiments, the haptic mechanism 104 is location in a portion (e.g., any portion) of an aircraft seat 102. In one example, the haptic mechanism 104 is located in a backside portion (e.g., cushion) of the aircraft seat 102 (as shown in FIG. 2). In one example, the haptic mechanism 104 is located in a base seat portion (e.g., below hips of a user—not shown) of the aircraft seat 102. Location of the haptic mechanism 104 in the base seat portion may be critical to alerting a user if the user is leaning forward and not in contact with the backside portion of the aircraft seat.

In embodiments, the system 100 is configured to show a graphical alert 116 on the display 114 based on the operation of the at least one of the one or more buttons 112 using the controller 106 (e.g., note that the controller 106 may be any controller, not necessarily the same controller 106 described above). For example, program instructions stored on memory 108 may be configured to display a graphical alert 116 when executed.

In embodiments, the graphical alert 116 is indicative of a request to at least one of: fasten seatbelts, stay seated/sit down, to allow egress past to or from the aisle, a generic ambiguous alert (e.g., exclamation point) usable for a variety of purposes, and/or the like.

In embodiments, the graphical alert 116 is at least one of text or symbol based.

In embodiments, the one or more buttons 112 include a backside button 112 (shown as a dashed rectangle) located on a backside of the aircraft seat 102.

In embodiments, the one or more buttons 112 include an armrest button 112 located on an armrest of the aircraft seat 102.

In at least one embodiment the passenger is a pilot and the aircraft seat 102 is a pilot aircraft seat. In this regard, a crew member may alert (e.g., awaken a pilot). For example, a sleep sensor may be used to sense when a pilot is asleep and the haptic mechanism 104 may be activated based on the sleep sensor.

In at least one embodiment the passenger is a crew member and the aircraft seat 102 is a crew member aircraft seat. In this regard, a crew member may be alerted. In at least one embodiment, a crew member aircraft seat 102 is configured to be capable of setting a timer (e.g., using a controller 106), such that when a set time on the timer ends, the haptic mechanism 104 is activated. In this regard, a crew member may use the system 100 to take a planned nap for a set amount of time and be awoken by the system 100.

In some embodiments, one or more aircraft seats 102, each with a haptic mechanism 104, may be configured to have the haptic mechanism 104 of each aircraft seat 102 activated (e.g., automatically or manually) during at least one of: a landing of the aircraft or a takeoff of the aircraft. For example, the one or more aircraft seats 102 may include one or more crew member aircraft seats and/or one or more pilot aircraft seats. In this regard, pilots and crew members may be alerted during, after, immediately before, and/or at a set time before a takeoff and/or landing procedure of the aircraft.

For example, a sleep sensor may be used to sense when a pilot is asleep and the haptic mechanism 104 may be activated based on the sleep sensor.

In embodiments, the one or more buttons 112 include a grouped button 112. For example, the grouped button 112 may be proximate to other buttons configured to activate other haptic mechanisms of other aircraft seats (e.g., similar to the one or more buttons 112). In this regard, a crew personnel (or other passenger) may conveniently alert one or more passengers (e.g., while standing in the aisle).

For example, the grouped button 112 may be proximate to text corresponding to the aircraft seat (e.g., a seat number). For example, the grouped button 112 may be located on an overhead panel (not shown) configured to be proximate to an aisle. In another example, the grouped button 112 is located in any other location, such as on any portion 120 (e.g., cushion or the like) of an aircraft seat 102 (e.g., the backside portion of the aircraft seat 102 or the armrest portion).

In embodiments, the one or more buttons 112 include a second grouped button. For example, the second grouped button may be operationally coupled to a second haptic mechanism (not shown) of a second aircraft seat (not shown, adjacent to the aircraft seat 102) and be configured to be selectively operated, the second grouped button 112 may further be configured to activate the second haptic mechanism based on an operation of the second grouped button. For example, the second grouped button may be located on the overhead panel and proximate to text corresponding to the second aircraft seat.

In embodiments, the one or more buttons 112 include any operable mechanism (e.g., depressible buttons, paddle switches, and the like).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain module or group of modules. Machine or computer-readable storage media, as referenced herein, do not include transitory media (i.e., signals in space).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for alerting a passenger, the system comprising:
    an aircraft seat comprising a haptic mechanism, the haptic mechanism configured to be selectively activated; and
    one or more buttons operationally coupled to the haptic mechanism and configured to be selectively operated, the one or more buttons further configured to activate the haptic mechanism based on an operation of at least one of the one or more buttons.

2. The system of claim 1, the system further comprising:
    a display positioned to be viewable from the aircraft seat and corresponding to the aircraft seat,
    a controller communicatively coupled to the display and the one or more buttons.

3. The system of claim 2, the system configured to show a graphical alert on the display based on the operation of the at least one of the one or more buttons using the controller.

4. The system of claim 3, the graphical alert indicative of a request to at least one of: fasten seatbelts, stay seated/sit down, to allow egress past to or from an aisle, or a generic ambiguous alert usable for a variety of purposes.

5. The system of claim 3, the graphical alert being at least one of text or symbol based.

6. The system of claim 1, the one or more buttons including a backside button located on a backside of the aircraft seat.

7. The system of claim 1, the one or more buttons including an armrest button located on an armrest of the aircraft seat.

8. The system of claim 1, the one or more buttons including a grouped button proximate to other buttons configured to activate other haptic mechanisms of other aircraft seats.

9. The system of claim 8, wherein the grouped button is located on an overhead panel configured to be proximate to an aisle.

10. The system of claim 8, wherein the grouped button is located on a backside of the aircraft seat.

11. The system of claim 1, the system including a second grouped button, wherein the second grouped button is operationally coupled to a second haptic mechanism of a second aircraft seat and is configured to be selectively operated, the second grouped button further configured to activate the second haptic mechanism based on an operation of the second grouped button.

12. The system of claim 1, the aircraft seat comprising a pilot aircraft seat configured to seat a pilot.

13. The system of claim 12, the system further comprising a sleep sensor configured to sense when a pilot is asleep, the haptic mechanism configured to be activated based on the sleep sensor.

14. The system of claim 1, the aircraft seat comprising a crew member seat configured to seat crew members.

15. The system of claim 1, the aircraft seat further comprising a timer.

16. The system of claim 15, the timer configured to activate the haptic mechanism at a set time.

17. The system of claim 1, the system configured to activate the haptic mechanism during at least one of a takeoff or landing procedure of an aircraft.

18. The system of claim 1, wherein the haptic mechanism is located in a backside portion of the aircraft seat.

19. The system of claim 1, wherein the haptic mechanism is located in base seat portion of the aircraft seat.

20. The system of claim 1, at least one of the one or more buttons located proximate to a pilot seat and configured to activate one or more haptic mechanisms of one or more aircraft seats.

* * * * *